United States Patent [19]

Quick

[11] 4,168,800

[45] Sep. 25, 1979

[54] COMBINATION HYDRAULIC CYLINDER AND SHOCK ABSORBER

[75] Inventor: Merle A. Quick, Cedar Rapids, Iowa

[73] Assignee: Allied Products Corporation, Chicago, Ill.

[21] Appl. No.: 866,406

[22] Filed: Dec. 30, 1977

[51] Int. Cl.² .................................................. B05B 1/20
[52] U.S. Cl. ...................................... 239/164; 267/124; 92/8
[58] Field of Search ................ 239/159, 164, 166–168; 267/DIG. 1, 65 R, 118, 124; 92/8, 51, 129

[56] References Cited

U.S. PATENT DOCUMENTS

| | | | |
|---|---|---|---|
| 2,679,827 | 6/1954 | Perdue | 92/51 X |
| 3,357,642 | 12/1967 | Horton | 239/159 |
| 3,972,476 | 8/1976 | Hall | 239/167 |
| 4,050,359 | 9/1977 | Mayer | 92/129 |

FOREIGN PATENT DOCUMENTS 2305116 10/1976 France ...................................... 239/168

Primary Examiner—Robert W. Saifer
Attorney, Agent, or Firm—Clarence A. O'Brien; Harvey B. Jacobson

[57] ABSTRACT

A combined hydraulic cylinder and shock absorber used in combination with a cantilever supported boom having a plurality of longitudinally spaced discharge nozzles thereon for flowable material with one end of the boom being pivotally supported from a vehicle, or the like, for vertical adjustment in a vertical plane with the hydraulic cylinder enabling angular adjustment of the boom about a horizontal axis and including a structure which provides a shock absorber to dampen and cushion vertical oscillation or bouncing movement about a horizontal axis as the boom and vehicle traverse uneven terrain such as when applying liquid fertilizer or other flowable material agent to the soil.

6 Claims, 4 Drawing Figures

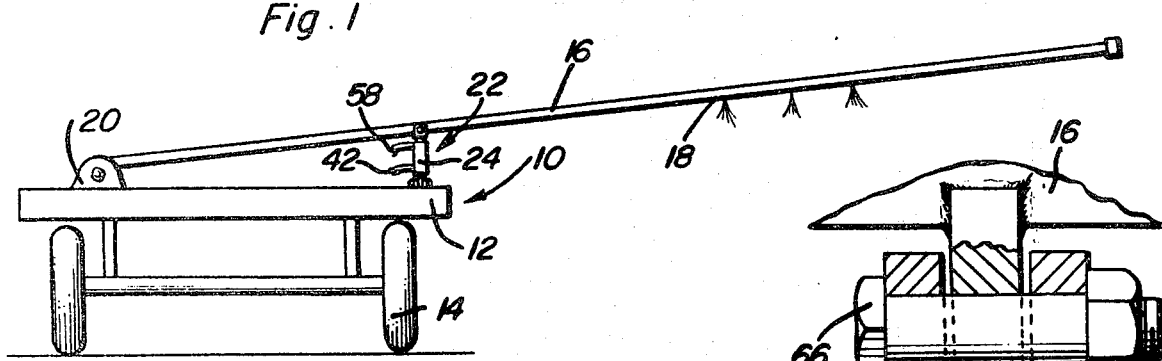
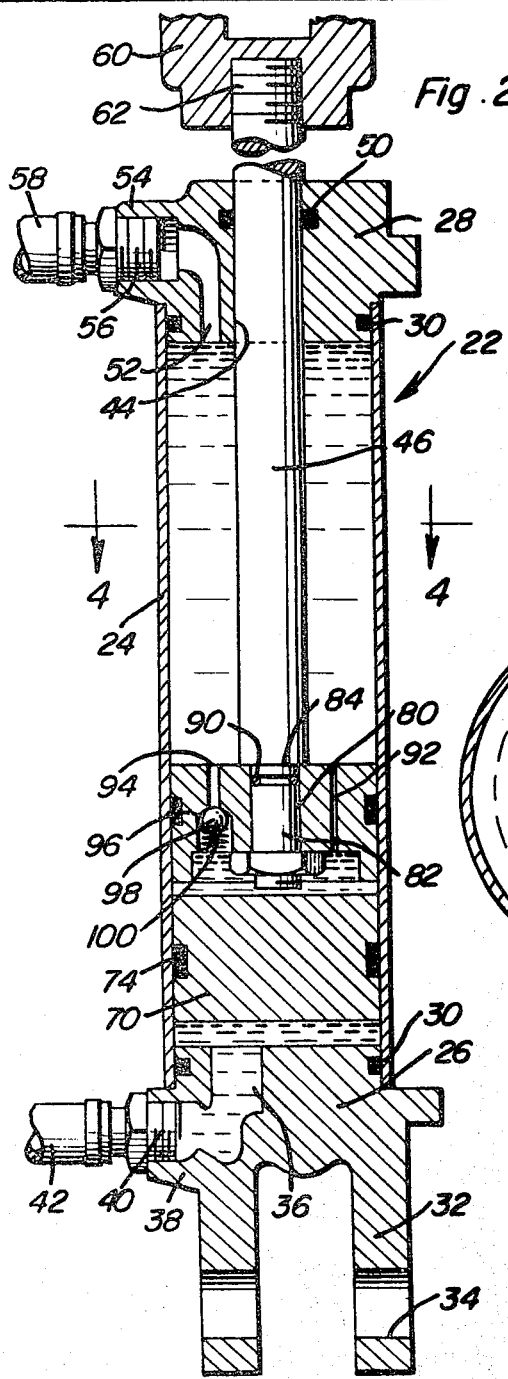
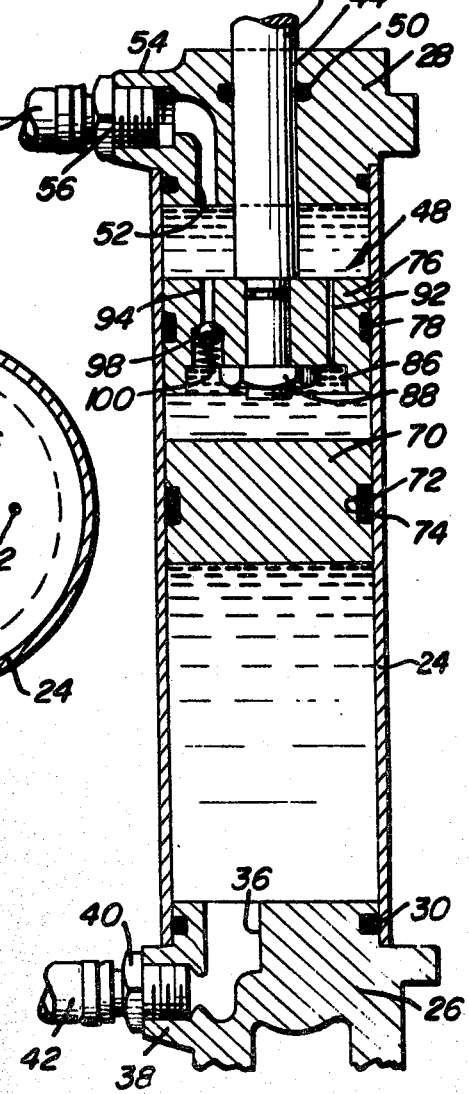
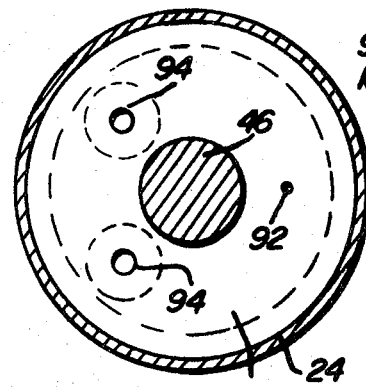

COMBINATION HYDRAULIC CYLINDER AND SHOCK ABSORBER

BACKGROUND OF THE INVENTION

1. Field of the Invention

The present invention generally relates to a combination hydraulic cylinder and shock absorber adapted for use in combination with a pivotally supported, elongated, generally horizontal spray boom to adjust the angular position of the boom about a horizontal axis and to cushion, dampen and control vertical swinging or oscillatory movement of the boom due to forces exerted on the boom by a supporting vehicle as it traverses uneven terrain such as when applying flowable material from the spray boom onto a land surface.

2. Description of the Prior Art

Spray booms are utilized for applying flowable material such as liquid fertilizer, water, or the like, to various land surfaces for increasing crop yield from the soil. Such devices include a powered vehicle, towed vehicle, or the like, and an elongated boom or elongated booms attached thereto generally in a cantilevered fashion with a plurality of discharge nozzles being spaced longitudinally along the boom or booms. Usually, the boom is horizontally oriented and frequently, the end of the boom attached to the vehicle is pivotally supported for swinging movement in a vertical plane about a fore-and-aft horizontal axis in order to adjust the position of the boom in a vertical plane. Due to the elongated nature of the boom, it is subject to considerable vertical oscillation, bouncing or swinging movement due to the vehicle passing over an uneven terrain especially when considering the resilient characteristics of the elongated boom itself and the relatively stiff springing of the vehicle so that when the vehicle wheel engages a sudden depression or projection in the ground surface, the boom will be subjected to considerable vertical swinging movement. If the boom is rigidly fixed in adjusted position by some type of clamp or hold-down, that portion of the boom outwardly of the hold-down point will still flex and swing with the hold-down point becoming a fulcrum point for the cantilevered portion of the boom which, under some conditions, results in bending or breakage of the boom due to extensive flexing of the boom about the stationary hold-down point.

SUMMARY OF THE INVENTION

An object of the present invention is to provide a combination hydraulic cylinder and shock absorber utilized to cushion and dampen the vertical swinging movement of a spray boom and also to adjust the position of the spray boom and to cushion and dampen the swinging movement of the spray boom at any adjusted position within the range of adjustment provided by the hydraulic cylinder.

Another object of the invention is to provide a combination hydraulic cylinder and shock absorber, in accordance with the preceding object, in which a hydraulic cylinder and shock absorbing piston assembly is provided in which the piston assembly includes a restricted flow orifice and check valve means to operate as a shock absorber and a floating piston assembly is provided in opposed relation to the shock absorbing piston in order to vertically adjust the position of the working chamber within the hydraulic cylinder, with both the floating piston assembly and shock absorber piston being moved upwardly to adjust the position of a spray boom and the floating piston assembly then becoming stationary and disposed in opposed relation to the shock absorbing piston so that the shock absorbing piston will function to absorb and dampen the forces exerted on the boom at any adjusted position within the range of extension and retraction of the hydraulic cylinder and piston assembly therein.

A further object of the invention is to provide a combination hydraulic cylinder and shock absorber including a hydraulic cylinder, a shock absorbing piston therein with a piston rod extending longitudinally from one end of the cylinder with the cylinder and piston rod being connected to points to be adjusted toward and away from each other and having relative movement therebetween cushioned or dampened, with a floating piston being disposed in the cylinder in opposed relation to the shock absorbing piston and being longitudinally adjustably positionable in the cylinder by controlling hydrualic fluid in both ends of the cylinder with the shock absorbing piston cushioning movement between the piston rod and cylinder at any point throughout the adjustment range of the floating piston assembly in the hydraulic cylinder.

Still another object of the invention is to provide a combination hydraulic cylinder and shock absorber for a pivotal, cantilever supported boom, or the like, which is relatively simple and compact in construction, effective for its purposes, easy to install and operate and dependable and long lasting in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic end view of a vehicle and spray boom with the combination hydraulic cylinder and shock absorber of the present invention combined therewith.

FIG. 2 is a longitudinal, vertical sectional view of the combination hydraulic cylinder and shock absorber of the present invention illustrating the hydraulic cylinder, floating piston and shock absorbing piston in retracted position.

FIG. 3 is a sectional view, similar to FIG. 2, but illustrating the floating piston in extended position and the shock absorbing piston spaced therefrom for cushioning or dampening movement of the boom.

FIG. 4 is a transverse, sectional view taken substantially upon a plane passing along section line 4—4 of FIG. 2 illustrating further structural details of the shock absorbing piston and piston rod.

DESCRIPTION OF THE PREFERRED EMBODIMENT

Referring now specifically to the drawings, FIG. 1 illustrates schematically a vehicle 10 which may be a farm tractor, trailer-type vehicle, or the like, pulled by a tractor or other towing vehicle which is schematically illustrated as including a platform 12 and supporting wheels 14. The platform 12 may be a tool bar attached to a farm tractor or any other supporting structure attached to a vehicle capable of being moved over ground surface for the purposes of traversing the ground surface along with an elongated spray boom 16 having a plurality of discharge nozzles 18 spaced longitudinally therealong with the inner end of the boom 16 being pivotally supported by a suitable bracket structure 20 on the supporting structure 12 of the vehicle 10. As the vehicle 10 traverses uneven surfaces, such as normally encountered in various fields to be utilized in crop production, the wheels 14 frequently will encounter ditches, depressions, rocks, or other projections, which results in swinging or bouncing movement of the boom 16 in a vertical plane. Due to the elongated structure of the boom, a substantial length thereof extends beyond the vehicle and is cantilever supported therefrom with the inherent resiliency and flexibility of the boom causing it to swing vertically. If the inner end of the boom is rigidly affixed to the vehicle, the fixed point of the boom will still form a fulcrum about which the outer end portion of the boom will flex which, after repeated flexing, will bend or break the boom. In the present invention, a combined hydraulic cylinder and shock absorber 22 interconnects the vehicle support or platform 12 and the boom 16 in spaced relation to the pivotal connection 20 for the inner end of the boom. The hydraulic cylinder and shock absorber 22 enables vertical adjustment of the boom in a vertical plane and also dampens and cushions vertical swinging oscillatory movement of the boom as the vehicle and boom transverse uneven terrain.

As illustrated in FIGS. 2-4, the hydraulic cylinder and shock absorber 22 includes an elongated cylinder 24 having a closure plug 26 in the lower end thereof and a closure plug 28 in the upper end thereof with O-ring seals 30 being provided for each plug and the plugs 26 and 28 being rigidly affixed to the ends of the cylinder 24 in any suitable manner so that when necessary, either of the plugs 26 and 28 may be removed for repair or replacement of components. The lower plug 26 is provided with a pair of longitudinally extending lugs 32 which are disposed in spaced parallel relation with the lugs 32 including aligned apertures 34 for receiving a pivot pin or bolt therethrough which also extends through an upwardly projecting apertured lug or ear attached to the vehicle support 12 in any suitable manner, so that the plug 26 and the cylinder 24 will be pivotally anchored to the vehicle support 12.

The lower plug 26 is also provided with a passageway 36 of right angular configuration which has one end communicating with the inner end of the plug 26 and the other end extending laterally from the plug 26 beyond the end of the cylinder 24 with the plug 26 including a laterally extending boss 38 which is internally threaded for receiving a threaded fitting 40 which has its outer end connected to a flexible hose 42 thus enabling hydraulic fluid to be admitted into the lower end of the cylinder 24 through the fitting 40 and passageway 36 and permitting exhaust of hydraulic fluid therethrough.

The plug 28 in the upper end of the cylinder 24 is provided with a longitudinal bore 44 therethrough in the center thereof for receiving a piston rod 46 movably therein with the inner end of the piston rod 46 being attached to a shock absorber piston assembly 48 which is reciprocal in the cylinder 24. An O-ring seal 50 is provided in the bore 44 for sealing engagement with the piston rod 46 to prevent leakage of hydraulic fluid between the piston rod 46 and the bore 44. The plug 28 also includes an angled passageway 52 therein with the inner end of the passageway 52 communicating with and terminating at the bottom end of the plug 28 and the upper end of the passageway extending laterally into a laterally extending boss 54 which is internally threaded for receiving a fitting 56 to which a hydraulic hose 58 is connected to supply pressurized hydraulic fluid into the upper end of the cylinder 24 and to discharge hydraulic fluid from the upper end of the cylinder 24.

The outer end of the piston rod 46 is provided with a U-shaped clevis 60 screw threadedly or otherwise fixedly attached to the piston rod 46 as at 62 with the two legs of the U-shaped clevis 60 having aligned apertures 64 therein for receiving a pivot bolt 66 which also extends through a depending lug 68 rigid with the boom 16 so that the piston rod 46 is pivotally connected to the boom 16 by the pivot bolt or pin 66 extending through the aligned openings in the legs of the clevis 60 and the lug 68.

Disposed interiorly of the cylinder 24 and below the shock absorber piston assembly 48 is a floating piston 70 which has substantially the same external dimension as the interior of the cylinder 24 so that it will move longitudinally therein. The peripheral center of the floating piston 70 is provided with a groove 72 provided with a seal structure 74 to prevent leakage between the floating piston 70 and the cylinder 24. The floating piston 70 is not attached to any structure within the cylinder 24 and is freely movable therein in response to selective admission and exhaust of hydraulic fluid in relation to the ends of the cylinder 24. The hoses 42 and 58 are connected with a hydraulic system including a pump, reservoir tank, control valve (not shown) and pressure relief valve 59 (see FIG. 3) so that hydraulic fluid may be admitted into either end of the cylinder 24 and hydraulic fluid may be exhausted from the opposite end at the same time. When the floating piston is in a lowered position such as in FIG. 2, hydraulic pressure admitted into the lower end of the cylinder 24 will move the floating piston 70 upwardly and also move the shock absorber piston assembly 48 upwardly with hydraulic fluid above the shock absorber piston assembly 48 being discharged through the passageway 52, fitting 56 and hose 58 back to a reservoir or other storage arrangement. Conversely, when hydraulic fluid is admitted into the upper end of the cylinder and exhausted from the lower end thereof, the floating piston 70 along with the shock absorbing piston assembly 48 will be moved downwardly to their lowermost position.

The shock absorbing piston assembly 48 includes a cylindrical piston 76 having a peripheral seal 78 in the center of the cylindrical peripheral surface thereof. The piston 76 is provided with a central bore 80 extending therethrough of smaller diameter than the piston rod 46 for receiving a reduced end portion 82 on the piston rod so that the shoulder formed between the piston rod 46 and the extension 82 thereon as defined by numeral 84 will abut the upper end of the piston 76. The lower or inner end of the piston 76 is provided with a recess 86 receiving a retaining nut 88 screw threaded onto the end of the axial extension 82 on the piston rod 46, thus rigidly fixing the piston 76 to the piston rod 46. An O-ring seal 90 is provided in a groove on the axial extension 82 in order to seal the bore 80 and the extension 82. The piston 76 is also provided with a small metering orifice 92 therethrough and a pair of larger passageways 94 are provided therethrough with the lower end of each passageway 94 being enlarged to define a valve seat 96 for a ball check valve 98 held against the seat by an optional light coiled spring 100, so that the ball valves 98 act as check valves to permit relatively rapid upward movement of piston 76 in the cylinder 24 such as would occur when the boom 16 and thus the piston rod 46 is forced upwardly by an upward force exerted on the boom 16. However, when the weight of the boom 16 tends to move the piston 76 downwardly, the 5 ball valves 98, of course, will be closed so that the only flow from the bottom of the piston 76 to the top of the piston 76 is through the restricted orifice 92 thus cushioning and dampening the downward movement of the boom 16, so that the boom will be slowly lowered back to its adjusted position after it has been elevated from its normal static position.

With the present invention, the compressive load exemplified by the boom 16 can be adjusted and held to any position within the stroke of the hydraulic cylinder. Yet, the shock absorbing piston assembly 48 will function as a shock absorber and return to the initial set position. Adjustment is obtained by supplying pressurized hydraulic fluid to either end of the cylinder while exhausting from the opposite end with the floating piston 70 supporting the weight or compressive load. Upward bounce of the boom will pull the piston rod 46 and piston 76 upwardly with hydraulic fluid passing through the piston 76 past the check valves 98. Then as the boom moves back downwardly, the check valves 98 close and the downward rate of movement is controlled by the orifice 92 with slow downward movement occurring until the piston 76 and piston rod 46 again are supported by the piston 70 and the boom 16 is held at its original adjusted position. While boom 16 is shown as a single cantilever supported member, it may include various parallel linkage arrangements, truss-like supporting structures, and the like, to enable vertical movement to storage position and breakaway horizontal movement when an obstruction is engaged. The pressure relief valve 59 provided in line 58 prevents piston rod 46 from re-extending after complete retraction thereof due to continued hydraulic pressure into port 54 and passage through check valves 98 which would move the piston 76 upwardly due to the differential in area provided by the piston rod 46. The pressure relief valve would, of course, open before the hydraulic pressure passes through the check valves 98.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an elongated spray boom having one end mounted on a vehicle subject to traversal of uneven terrain and the other end cantilever supported therefrom for adjustment in a vertical plane and subject to vertical bouncing when traversing uneven terrain, a combined hydraulic cylinder and shock absorber interconnecting the boom and vehicle for adjusting the position of the boom in a vertical plane in relation to the vehicle and cushioning and dampening vertical oscillatory movement of the boom in relation to the vehicle as the vehicle and boom traverse uneven terrain which causes the boom to bounce due to its resilient characteristics, said hydraulic cylinder and shock absorber including a cylinder having a hydraulic fluid inlet and outlet port at each end thereof for communication with a control valve and hydraulic fluid system for selectively introducing and exhausting hydraulic fluid from each end of the cylinder, a shock absorber piston assembly movably disposed in said cylinder, a piston rod connected with the shock absorber piston assembly and extending through one end of the cylinder in sealed relation for connection with the vehicle or boom, and a floating piston in said cylinder inwardly of the shock absorber piston assembly for enabling initial adjustment of the shock absorber piston assembly and the piston rod in relation to the cylinder, said shock absorber piston assembly including a piston rigid with the piston rod and including a small orifice therethrough for controlled flow of hydraulic fluid through the piston, said piston rigid with the piston rod also including check valve means therein enabling relatively unrestricted flow of hydraulic fluid past the piston rigid with the piston rod in the direction away from the floating piston so that bounce of the boom will be permitted in an upward direction with the only restriction being the size of the flow path defined by the check valve means with the orifice controlling flow and movement of the boom back to its initial set position thereby cushioning and dampening the bounce of the boom.

2. The structure as defined in claim 1 wherein said check valve means includes a pair of circumferentially spaced passageways in the piston rigid with the piston rod, a ball valve assembly in each of the passageways with the ball valve assemblies being in closed position during movement of the piston on the piston rod toward the floating piston whereby flow of hydraulic fluid through the orifice will control movement of the piston on the piston rod toward the floating piston.

3. The combination as defined in claim 2 wherein the hydraulic fluid inlet at the upper end of the cylinder and above the shock absorbing piston is provided with pressure relief means to prevent upward movement of the shock absorbing piston due to the differential in area between the bottom surface and top surface of the shock absorbing piston when pressure is admitted into the top of the cylinder when adjusting the floating piston and boom to a different elevation.

4. The combination of claim 1 wherein said cylinder is substantially vertically disposed with the lower end thereof pivotally connected to the vehicle, the upper end of the piston rod being pivotally connected with the boom in laterally spaced relation to the pivotal connection between the boom and vehicle.

5. In combination, a vehicular structure, an elongated spray boom assembly supported from the vehicular structure in a cantilever manner for movement in a generally vertical plane and a combined hydraulic cylinder and shock absorber interconnecting the vehicular structure and boom assembly for adjustably supporting the boom assembly at a desired elevation and absorb and cushion vertical oscillation of the boom assembly at the set position, said cylinder and shock absorber comprising an elongated cylinder having a hydraulic fluid port at each end thereof for selective inlet and outlet of hydraulic fluid, a piston rod extending longitudinally through one end of the cylinder, a shock absorbing piston on the inner end of the piston rod, a floating piston in the cylinder between the shock absorbing piston and the end of the cylinder remote from the piston rod, said shock absorbing piston including a small orifice therein to enable controlled flow of hydraulic fluid therethrough so that movement of the boom assembly will be controlled as the shock absorbing piston moves toward the floating piston, said shock absorbing piston also including a passageway larger than the orifice, said passageway including check valve means therein to enable substantially unrestricted flow of hydraulic fluid therethrough when the shock absorbing piston moves away from the floating piston and preventing hydraulic fluid flow through the passageway when the shock absorbing piston moves towards the floating piston, said floating piston being adjustable in the cylinder by selectively admitting hydraulic fluid into one end of the cylinder and exhausting hydraulic fluid from the other end thereof, thereby initially setting the position of the shock absorbing piston and piston rod with movement of the shock absorbing piston away from the floating piston being relatively unrestricted while movement of the shock absorbing piston toward the floating piston being restricted by hydraulic flow through the orifice, thereby cushioning and dampening movement of the boom assembly with the function of the shock absorbing piston remaining the same throughout the stroke of the floating piston and shock absorbing piston within the cylinder.

6. The structure as defined in claim 5 wherein said floating piston is completely independent of the shock absorbing piston with the orifice through the shock absorbing piston controlling flow of fluid from the area between the floating piston and shock absorbing piston to control the movement of the shock absorbing piston toward the stationary adjustable floating piston so that the boom assembly may rapidly move in a direction to move the shock absorbing piston away from the floating piston with return movement being controlled due to the small size of the orifice in the shock absorbing piston.

* * * * *